United States Patent [19]

Cox

[11] 3,774,059
[45] Nov. 20, 1973

[54] ROTARY STEPPING MOTOR WITH LAMINATED STATOR AND ROTOR POLE CONSTRUCTION

[75] Inventor: Irvin W. Cox, East Acton, Mass.

[73] Assignee: Cambridge Thermionic Corporation, Cambridge, Mass.

[22] Filed: Sept. 13, 1971

[21] Appl. No.: 179,951

[52] U.S. Cl. ................................. 310/49, 310/268
[51] Int. Cl. .......................................... H02k 37/00
[58] Field of Search ...................... 310/49, 268, 162, 310/163, 43, 258; 318/138, 685

[56] References Cited
UNITED STATES PATENTS

| | | | |
|---|---|---|---|
| 2,550,571 | 4/1951 | Litman | 310/268 |
| 1,353,025 | 9/1920 | Chicken | 310/49 |
| 1,041,482 | 10/1912 | Keilholtz | 310/49 |
| 3,502,914 | 3/1970 | Cox | 310/43 |
| 3,005,118 | 10/1961 | Ranseen | 310/49 |
| 3,469,123 | 9/1969 | Inaba | 310/49 |
| 2,993,159 | 7/1961 | Devol | 310/268 |
| 3,483,406 | 12/1969 | Inaba | 310/268 |

*Primary Examiner*—R. Skudy
*Attorney*—Sewall P. Bronstein et al.

[57] ABSTRACT

A multiphase rotary stepping motor of the type wherein each phase has a stator with a plurality of flux-conductive stator poles, a rotor with a plurality of flux-conductive rotor poles alignable with the stator poles, and a coil energized with appropriate timing to produce a magnetic field through said stator poles and rotor poles to bring them into alignment to thereby advance or retard the rotation of a shaft to which the rotors are attached. The rotor poles and stator poles are laminated from thin strips of flux-conductive material oriented so that at the confronting pole faces of rotor and stator, the longer dimension of the strip ends extends in a circumferential direction to permit high flux concentration at approaching or receding edges of the rotor and stator poles. The stator poles are constructed from a plurality of nesting strips of flux-conductive material assembled in two abutting C-shaped sections to form a rectangular loop having a gap therein to receive a rotor pole, the coil extending through the loop. The nesting strips in each C-shaped section have straight leg portions, graduated with increasing length toward the outside of the loop, joined by curved corners bent with a common radius of curvature. The leg length is graduated to provide a flush pole face at the gap and a flush abutting face for contact with the other C-shaped section, and the graduated increase in leg length is greater than the strip thickness in order to allow for minor deviations in length. Each C-shaped section is mounted between inner and outer mounting rings by being embedded therebetween with epoxy plastic. The rotor poles are constructed from a single strip of material wound spirally around a core member located axially between the inner rings of the stator. The strip is provided with wide portions forming the rotor poles, alternating with narrow portions between the wide portions. The narrow portions have graduated increases in circumferential length toward the outside of the spiral so that the wide portions are radially aligned and the rotor poles therefore extend radially. The spirally wound strip is mounted by embedding it and an outer flange of the core member with epoxy plastic.

1 Claim, 7 Drawing Figures

United States Patent
Cox
[11] 3,774,059
[45] Nov. 20, 1973
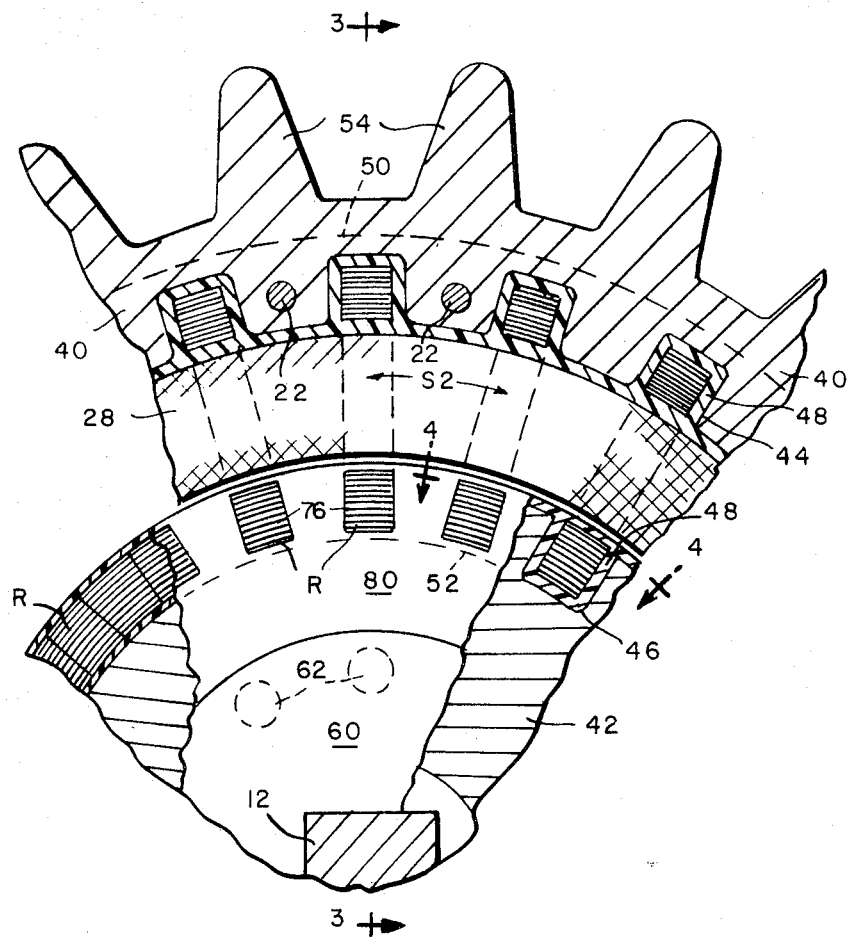

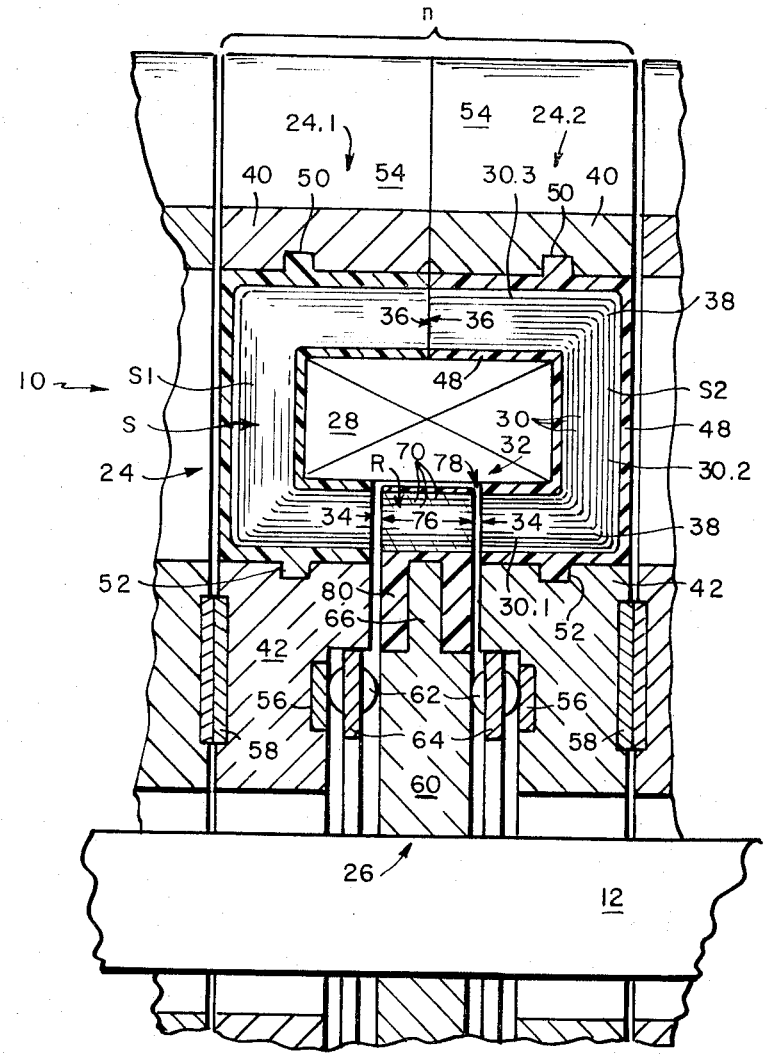
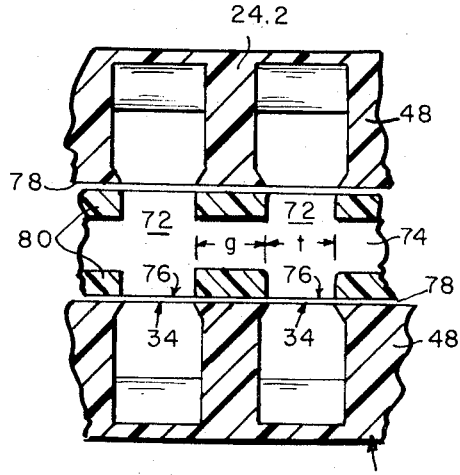
FIG.4
FIG.3
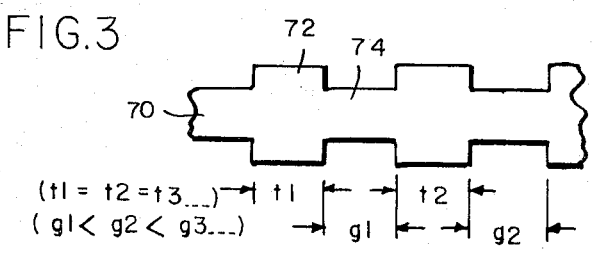
$(t1 = t2 = t3 ...)$
$(g1 < g2 < g3 ...)$
FIG.5
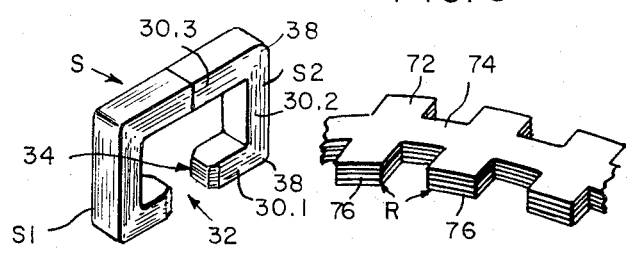
FIG.6  FIG.7

ROTARY STEPPING MOTOR WITH LAMINATED STATOR AND ROTOR POLE CONSTRUCTION

BACKGROUND OF THE INVENTION

The field of the present invention relates to stepping motors, and more particularly to the construction of and method for making the stator poles and rotor poles in a stepping motor.

Stepping motors, in one frequently encountered form, have a number of phases, each comprising a set of rotor poles, a set of stator poles alignable with the rotor poles, and a coil energizable in response to signal processing equipment such as a computer to bring the rotor and stator poles into alignment through magnetic interaction. The phases have their rotor or stator poles successively offset by an angle, measured in degrees, equal to 360/NM where N equals the number of phases and M equals the number of rotor or stator poles in each phase. The phases are energized sequentially with a phase lag related to their angular offset, thereby brining successive sets of poles into alignment and causing rotation of the shaft to which the rotors are affixed.

One of the advantages of stepping motors is their ability to provide precise angular control, useful for numerical or pulse programmed control of machinery, for example, in response to electronic signal processing equipment. The angular control which is afforded is equal to half the angular offset, which in a five phase, 20 pole motor is 3.6°. In response to pulsed instructions, the motor can control precisely the linear travel of a machine part by rotating a leadscrew through a precise angle, with the advantage of travel in both directions and a programmable start and stop. The speed of these operations is limited by the pulse rate of the instructions, and by the ability of the motor to respond at high frequencies and to rapid changes in the pulse rate.

Recent increases in the speed of electronic signal processing have considerably outstripped the ability of stepping motors to deliver controlled power in response to this fast processing. Hence, to narrow the gap between signal speed and mechanical performance, it is necessary to improve the ability of the stepping motor to react at high speeds. Since a stepping motor reacts by magnetic interaction between rotor and stator poles in response to current through a coil, a faster reaction can be obtained in one approach by increasing the magnetic forces with increases in current, or with improved control of current as disclosed in the copending applications of William McDonald, Ser. Nos. 139,721 and 139,722, filed respectively May 3, 1971 and May 3, 1971.

In another approach, improved magnetic interaction is sought by improving the flux-conducting elements of the magnetic circuit, the rotor and stator poles, in an effort to increase the useable attractive magnetic force available from a given current. Following this approach, many attempts have been made to improve performance, primarily in development of materials with high magnetic permeability, in construction of poles with reduced high frequency losses, such as laminated poles to reduce eddy losses, and also in reduction of air gap distance between poles. Despite there efforts, however, stepping motors continue to lack sufficient muscle to keep pace with the speeds of modern processing equipment, and practical improvements are still sorely needed.

SUMMARY OF THE INVENTION

Objects of the present invention are to provide a stepping motor having a rotor and stator pole construction which provides improved stepping motor performance, which permits high speed operation, which is reliable in use and which has a method of construction which is simple and economical.

According to the invention, the rotor and stator pole construction is characterized by lamination from thin strips of standard flux-conductive material oriented so that, at the confronting pole faces of rotor and stator, the longer dimension of the strip edge extends in a circumferential direction to permit flux paths to extend toward approaching or receding edges of the poles with high flux concentraction for increased magnetic interaction. The strips are made of grain oriented material, such as silicon iron, with the grain direction oriented normal to the pole faces.

The stator poles are formed from a plurality of nesting strips of the flux-conductive material arranged to form a loop having a gap therein to receive a rotor pole, the coil extending through the loop, and the strips extending around the loop and having their ends form pole faces at said gap. In further aspects, the loop is substantially rectangular and is formed from strips with straight leg portions joined by curved corner portions; the gapped rectangular loop is formed in two C-shaped sections having flush abutment faces and flush pole faces; the graduated increase in length of the strips is greater than the thickness of the strip to accommodate deviations in strip leg length; and the C-shaped sections are embedded in plastic, such as epoxy, between inner and outer mounting rings. Magnetic poles in the mold draw the nested C-shaped sections to fiduciary pole surfaces before molding, so that no machining is necessary.

The rotor poles are formed with a plurality of layers of strip material forming a ring around a core member. The strip material has wide portions forming the rotor poles, alternating with narrow portions having graduated increases in circumferential length toward the outside of the ring so that the wide portions are radially aligned and the rotor poles extend radially. In further aspects, the strip material is spirally wound around the core member and is embedded in plastic, such as epoxy, along with a peripheral flange of the core member.

The method of making the stator poles includes cutting the plurality of strips of graduated length, bending them at preselected points with a common radius of curvature, assembling them with the ends of the strips flush on magnetic fiduciary surfaces in the mold, and molding or embedding the assembled strips in plastic such as epoxy. The rotor pole is made according to a method wherein a strip has narrow portions out therein with gradually increasing lengths, followed by winding the strip spirally around a core member and embedding the wound strip in plastic such as epoxy.

These and other objects and novel aspects of the invention will be apparent from the following description of a preferred embodiment.

DESCRIPTION OF THE DRAWING

FIG. 3 is an axial section taken on line 3—3 of FIG. 2;

FIG. 4 is a circumferential section taken on line 4—4 of FIG. 2, showing the relationship of rotor to stator;

FIG. 5 is a plan view of the strip from which the rotor poles are formed;

FIG. 6 is a perspective view of the nesting strips forming a stator pole; and

FIG. 7 is a partial perspective view of the spirally wound strip forming the rotor poles.

DESCRIPTION OF THE PREFERRED EMBODIMENT

Figure 1:
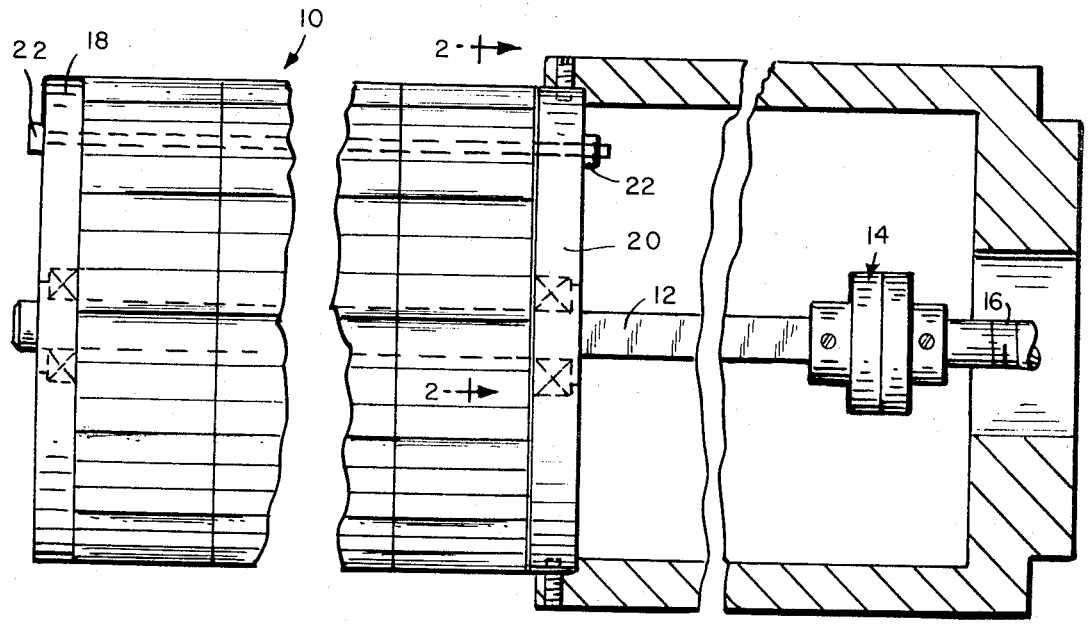
FIG. 1 is a side elevation, partially in section, showing a stepping motor according to the invention.

FIG. 1 illustrates a typical use for a stepping motor 10 according to the invention, that of supplying power to precisely rotate a shaft 12 which is coupled through a linkage 14 to a leadscrew 16 to control the travel of a mechanical device (not shown) such as a drill press, drafting instrument, or position locator.

Figure 2:
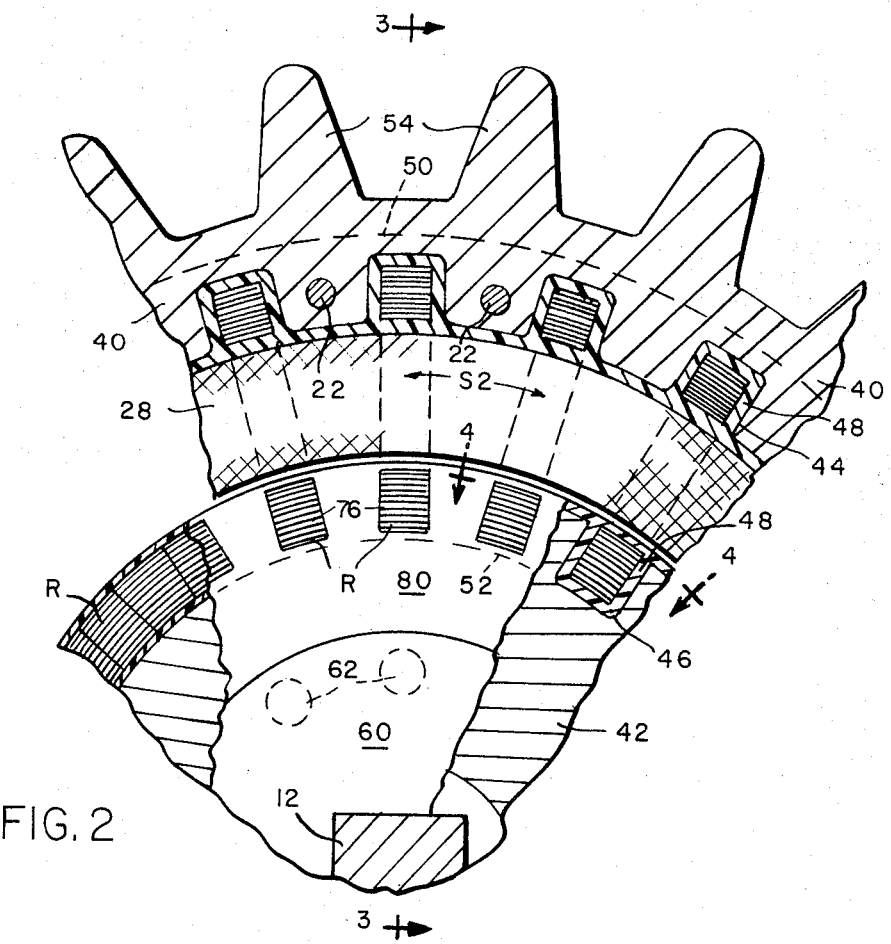
FIG. 2 is a section on line 2—2 of FIG. 1, with a portion of the rotor assembly in section and another portion broken away to show a portion of the stator.

The illustrated stepping motor 10 is of multiphase type, having several separable phases distributed axially along shaft 12 and secured to end plates 18, 20 with through bolts 22. Because the phases differ only in their angular offset with respect to one another, the following description will relate only to a single typical phase $n$ of motor 10, as illustrated in FIGS. 2, 3, and 4.

Phase n of motor 10 comprises a stator 24 with a plurality of circumferentially distributed stator poles S, a rotor 26 with an equal number of circumferentially distributed rotor poles R, and a coil 28.

Each stator pole S, as shown in FIGS. 3 and 6 is formed from a plurality of nesting strips 30 of thin flux-conductive material, for example fifty strips of 0.004 inch thick silicone iron providing a 0.200 inch thick laminated structure. The strips are grain-oriented with the grain direction extending lengthwise of the strips.

The stator pole strips 30 are arranged in two confronting C-shaped sections $S_1$ and $S_2$ which together form a rectangular loop around coil 28, with a gap 32 provided in the rectangular loop to receive the rotor poles R. The ends of strips 30 provide flush pole faces 34 with bevelled leading and trailing edges at gap 32, and flush abutment faces 36 for magnetically connecting the C-shaped sections together. As shown in FIGS. 2 and 6, the strip ends at pole faces 34 have their long dimension (across the width of the strip) extending in a circumferential direction to permit flux to concentrate at the leading and trailing edges for increased attractive forces.

Each C-shaped section $S_1$, $S_2$ is formed from nesting strips 30 having a short end leg 30.1, an intermediate leg 30.2 and a long leg 30.3. The straight leg portions 30.1, 30.2, and 30.3 are joined respectively by curved corner portions 38 with a common radius of curvature, for example one sixty-fourth inch provided by uniformly bending the strips.

The strip leg portions 30.1, 30.2, and 30.3, as shown in FIGS. 3 and 6, have graduated increases in length toward the outside of the rectangular loop to permit compact nesting of the strips and also to yield flush pole faces 34 and flush abutment faces 36 when drawn down on fiduciary magnetic surfaces in the mold. The graduated increases in length of intermediate leg portion 30.2 are equal to the thickness of the strips 30, or at least commensurate therewith. However, in accordance with one technique of this invention, the graduated increases in length of the end legs 30.1 and 30.3 are greater than the thickness of the strips 30 by a small amount, for example 0.0005 inches, to accommodate small deviations in length of the end legs 30.1 and 30.3 caused by cutting or bending deviations, and thereby to permit the pole faces 34 and abutment faces 36 to be drawn flush despite these deviations in length.

The construction of C-shaped sections $S_1$ and $S_2$ is accomplished by cutting a succession of straight strips of fluxconductive material with graduated length as explained above, and by bending the cut strips to provide appropriately located corners 38 of uniform curvature. The bent strips are then assembled in nesting fashion to provide the C-shaped sections, with the pole faces 34 and abutment faces 36 being held flush by fiduciary magnetic pole surfaces in the mold.

The assembled C-shaped sections $S_1$ and $S_2$ are then incorporated into stator subassemblies 24.1 and 24.2 respectively. The two subassemblies are identical, and therefore interchangeable, each subassembly comprising an outer ring 40 and an inner ring 42 made, for example, of aluminum and sized to receive the C-shaped sections therebetween in appropriate circumferentially spaced recesses 44 and 46 (FIG. 2). Rings 40 and 42, when positioned correctly in relation to the C-shaped sections $S_1$ or $S_2$, are united therewith by placing these parts in a mold and molding hardenable plastic material 48, such as epoxy, in the spaces around the C-shaped sections between rings 40 and 42 to provide a unitary structure with the C-shaped sections embedded in the plastic material 48. To provide axial stability, grooves 50,52 are provided in rings 40, 42 to act as circular keyways when filled with the plastic material 48.

Further details of the stator subassemblies 24.1 and 24.2 as shown in FIGS. 2 and 3, include cooling fins 54 on the outer rings 40, and hardened bearing races 56 and Belleville washers 58 inserted on opposite sides of inner rings 42.

The rotor 26 includes a circular disk-shaped core member 60 of hardened tool steel having a square central hole to engage square shaft 12, and opposite sides in contact with bearings 62 in retainers 64 to maintain accurate low friction spacing form the stator inner rings 42.

Core member 60 has a central peripheral flange 66 around which are spirally wound a plurality of layers of strip material 70 of flux-conductive material such as silicon iron. The spirally wound layers form a ring of flux-conductive material around core member 60.

As shown in FIGS. 2, 4, 5, and 7, strip 70 is provided with a succession of wide portions 72 in width equal to the thickness of core member 60 and of constant circumferential length $t$. Wide portions 72 alternate with narrow portions 74 which have a graduated increase in circumferential length $g$ toward the outside of the ring so that the wide portions 72 are superimposed over on another in radial alignment and thereby form a plurality of radially extending rotor poles R which fit in gap 32 of the rectangular loop formed by stator poles S. The edges of the wide portions 72 of strip 70 form rotor pole faces 76 which, as shown in FIGS. 3 and 4, confront stator pole faces 34 across narrow air gaps 78 whose dimension is kept constant by bearings 62 as explained above. The strip edges which form rotor pole faces 76 have their long dimension extending in a circumferential direction as shown in FIGS. 2 and 7, thereby permitting high flux concentrations at the leading and trailing edges of the rotor poles R.

The rotor poles R are constructed from a long strip of standard flux-conductive material which is provided along its sides with rectangular notches having graduated increases in circumferential length to provide the narrow portions 74 described above. The notched strip is wound spirally around core member 60 so that wide portions 72 align radially to form rotor poles R. The assembled strip and core member 60 so that wide portions 72 align radially to form rotor poles R. The assembled strip and core member are inserted in a mold and hardenable plastic material 80, such as epoxy, is inserted in the mold to fill the spaces between the rotor poles and on each side of flange 66, to embed the rotor poles R and form a unitary rotor 26 that is disk-shaped.

The stepping motor 10 is assembled from the constituent parts described above in a simple layer-by-layer assembly process. For example, phase n shown in FIG. 3 would be assembled by fitting stator subassembly 24.1 over shaft 12 and resting it against the adjacent phase; inserting the left-hand set of bearings 62 in race 64; sliding rotor 26 over shaft 12, the orientation of the square hole in core member 60 determining the proper angular offset of the rotor poles R for this phase; placing coil 28 within C-shaped section $S_1$; inserting the righthand set of bearings 62 in race 64; and adding stator subassembly 24.2. When all phases are assembled, the bolts 22 are secured and the motor assembly is completed.

It should be understood that the foregoing description is for the purpose of illustration and that the invention includes all modifications and equivalents falling within the scope of the appended claims. For example, although the stator and rotor pole construction described herein has been shown in relation to a particular style of stepping motor with axially distributed phases, the construction is applicable to other stepping motor designs as well.

I claim:
1. A rotary stepping motor of the type having a stator with a plurality of stator poles, a rotor with a plurality of rotor poles alignable with the stator poles, and a coil for producing a magnetic field through the rotor poles and stator pole construction being characterized by
a plurality of nesting strips of flux-conductive material arranged to form a substantially rectangular loop with a gap therein to receive a rotor pole, said coil extending through said loop, said strips extending around said loop and having their ends form pole faces at said gap, the longer dimension of said strip ends extending circumferentially of the motor, said strips having substantially straight leg portions joined by curved corner portions with a common radius of curvature, the legs of the strips being graduated with increasing length toward the outside of the loop for nesting, the legs adjacent said gap being sized so that the ends of the strips provide flush pole faces at said gap, and wherein the ends of the strips at said gaps are bevelled to provide bevelled leading and trailing edges for said pole faces.

* * * * *